Patented Oct. 14, 1952

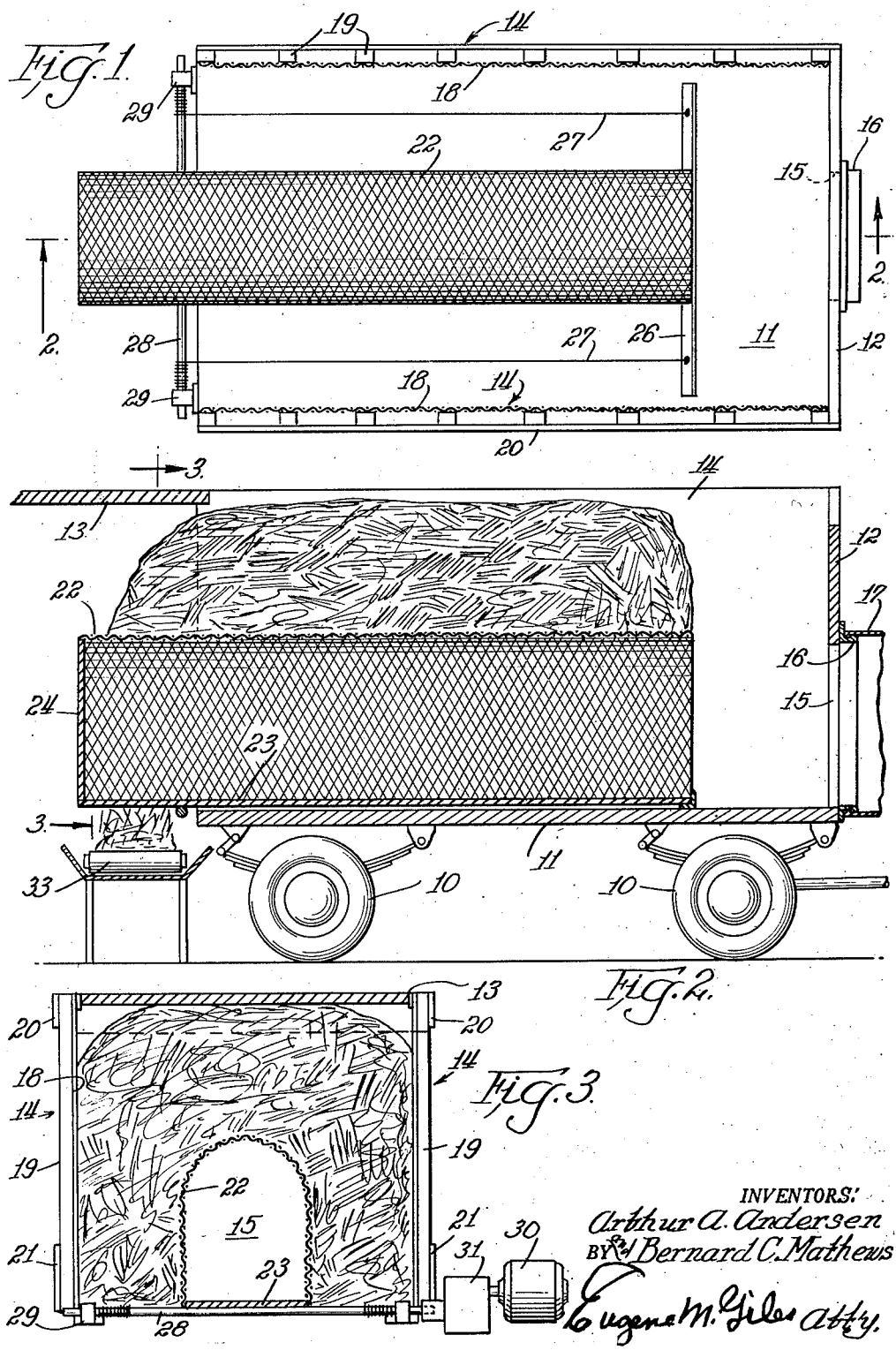

2,613,452

UNITED STATES PATENT OFFICE 2,613,452

CROP DRIER AND UNLOADER

Arthur A. Andersen, Crystal Lake, and Bernard C. Mathews, Chicago, Ill., assignors to American Crop-Drying Equipment Company, Crystal Lake, Ill., a corporation of Illinois Application October 27, 1949, Serial No. 123,894

4 Claims. (Cl. 34—229)

Our invention relates to crop drying equipment of the character described in our copending application Serial No. 716,218, filed December 14, 1946 now Patent No. 2,532,530, and has more particular reference to a wagon having a slidable duct installation for drying of farm crops in the wagon and for convenient unloading of the crops.

It has been found that the nutrients in certain farm crops such as hay, alfalfa, corn, wheat, oats, barley, and the like can best be preserved during storage when they are dehydrated quickly. For example, freshly cut hay should not be permitted to cure in the field for more than three to five hours. It should then be dehydrated rapidly to about fifteen per cent moisture content which is considered to be desirable for storage purposes. In order to retain maximum food value, the removal of excess moisture content should be accomplished rapidly under controlled drying conditions.

The principal objects of our invention are to provide crop drying and unloading facilities which may be installed readily in ordinary farm wagons; to design such facilities which will insure uniform dehydration of substantial crop loads; to permit drying of such crops in the conveyance in which they are loaded in the field; and to enable convenient unloading of such crops after dehydration, these and other objects being accomplished as hereinafter described, reference being had to the accompanying drawing in which:

Fig. 1 is a top view showing the floor plan of a crop drying wagon embodying our invention and showing the reciprocable drying duct partially extended;

Fig. 2 is a vertical sectional view on the line 2—2 of Fig. 1; and

Fig. 3 is a vertical sectional view on the line 3—3 of Fig. 2.

Referring now to the drawing, the reference numeral 10 indicates the running gear of the wagon on which our crop dryer and unloader is installed, the latter comprising a box like compartment, open at the top and having a floor 11, a front wall 12, a tail gate 13 and two side walls 14.

The floor 11 and front wall 12 are of any conventional plank or panel construction and are substantially closed to air circulation therethrough, except that the front wall 12 is provided with a large air inlet opening 15 therethrough adjoining the floor 11 and centered between the side walls 14. The said air opening or inlet 15 has a peripheral attaching flange 16 therearound which projects forwardly from the front wall 12 and is adapted to be engaged by a flexible hot air duct 17 which is connected to a suitable hot air source such, for example, as the portable drier shown in our application Serial No. 71,834, filed January 21, 1949, now Patent No. 2,604,312.

The side walls 14 of the wagon 10 are freely penetrable by air and may be made of heavy gauge wire screen 18 nailed or stapled to the inner sides of uprights 19 which extend upwardly from the floor 11 along each side thereof and at their upper and lower ends to connecting strips 20 and 21 respectively. Where a wagon is used which has solid side walls, such as a silage wagon, the uprights 19 may be mounted on the inner sides of such walls and have the wire screen 18 secured to the inner sides of these uprights, or that the uprights 19 serve as spacers providing an air space between the solid sides and the screen wall 18.

The mesh of the wire screen 18 should depend upon the material to be dehydrated. A larger mesh will suffice where chopped hay, alfalfa, or the like is to be processed, whereas a finer mesh would be required to contain the smaller grains and to prevent loss through the side walls 14.

Preferably the side walls 14 extend about one foot higher than the front wall 12, thus forming barriers at each side of the front wall 12 so that when a harvester spout is resting thereon, it will not slide off at either side.

Our crop dryer and unloader comprises a tunnel member 22 having perforated top and side walls and a solid bottom 23, and is closed at the rear end as indicated at 24 and open at the front end. The said tunnel member 22 is installed lengthwise in the wagon 10 with its open end in alignment with and fitted to the air inlet 15 in the front wall 12 so that air entering the opening 15 is communicated to the interior of the tunnel or duct 22. The said tunnel member 22 is preferably of sheet steel construction with a frame of either steel or wood. In our preferred construction, the perforations in the top and side walls of the tunnel member are diamond shaped openings as indicated in Figs. 1 and 2 and about ¾ inch by 1½ inches in size, which is especially suitable for drying hay. Where the smaller grains are to be dried, the top and side walls of the tunnel member 22 are covered with relatively fine mesh wire screen.

The tunnel member 22 should be of the same length as the inside length of the wagon so that when the open front end of the tunnel member abuts against the front wall 12 of the wagon, the tail gate 13 may be closed against the closed end 24 of the tunnel member 22. The tail gate 13 may be hinged at the top rear of the wagon 10 in any suitable manner so that it may be swung open as shown in Fig. 2 to afford unobstructed access to the interior of the wagon and to the tunnel member 22 or closed to form the rear wall of the drying compartment.

The width and height of the tunnel member 22 will depend upon the interior dimensions of the compartment in which it is installed, so that the thickness of the crop load to be dried at the top and sides of the tunnel member will not exceed that which may be dried efficiently. When hay is to be dried the thickness of the mass of hay between the tunnel 22 and the side walls 14 should be about 22 inches and should not exceed 26 inches. Thus, for drying hay in a wagon where the inside width is from 72 to 80 inches, we use a tunnel about 28 inches wide. The tunnel member 22 should be about 42 inches high and the hay should be loaded into the wagon to a depth of about 22 to 26 inches over the top of the tunnel member 22. When smaller grains are to be dried, the thickness of the load measured outwardly from the tunnel member 22 should be about 16 inches, and the dimensions of the drying enclosure and the tunnel member should be determined accordingly.

At its front open end the tunnel member 22 is provided with a transverse bar 26 at the bottom which may be of angle iron or the like and to the outer ends of which cables 27 are attached. These cables 27 are connected to and wind on a transverse shaft 28 which is journaled at 29 to rotate at the rear end of the floor 11. As the shaft 28 is turned, it tends to wind up the cables 27 and pulls the tunnel member 22 outwardly over the shaft 28. The shaft 28 is mounted so the top thereof is sufficiently above the wagon floor 11 so that it provides roller support for the tunnel member 22 when the latter is being withdrawn from inside the wagon. The shaft 28 may be rotated by any suitable means such as a crank or by means of a motor 30 as shown in Fig. 3. The motor 30 operates through a reduction gear 31 to reduce the speed of rotation and the latter has a detachable connection with the shaft 28. The shaft of the reduction gear 31 may be squared at the end for this purpose and engageable in a square socket 32 of corresponding shape at the end of the shaft 28. With this type of connection, the motor may be disconnected quite readily from the shaft 28 so that it may be used elsewhere for other purposes.

When a wagon is equipped with our crop drier and unloader, as described, the crop may be loaded directly into the wagon in the field. The tunnel member 22 should be inserted in position with the forward end fitted closely to the air inlet 15, and the tail gate 13 should be closed securely. The crop may be loaded into the wagon as it would be loaded into any conveyance, such as through the spout of a harvester. The wagon may then be hauled to any convenient location for drying at which place forced hot air may be supplied to the air inlet 15 by means of a hot air duct 17 from a portable drier such as mentioned above.

The hot air is forced under pressure into the tunnel member 22 and is uniformly distributed therefrom through the perforated top and side walls of the tunnel member 22 to the crop load. The hot air removes moisture from the crop as it passes through the mass and is exhausted through the open sides and the top of the wagon.

The forcing of hot air through the crop is continued until the moisture content is reduced to the proper level, usually about fifteen per cent. The moisture content may of course be determined by testing samples of the crop in a suitable moisture tester.

When the proper moisture content is reached, the tail gate 13 is opened so as to permit removal of the dried crop. The crop is unloaded by moving the tunnel member 22 outwardly and permitting the hay or grain to drop off. The dropping off may be expedited by means of pitch forks if desired. As a result of the drying operation, the hay or grain tends to cling in a body to the tunnel member 22 and hence it moves outwardly therewith from the wagon.

The hay or grain as it is unloaded may be deposited on a continuous belt conveyor 33 as shown in Fig. 2 and conveyed thereby to the place of storage, or it may be collected and removed for storage in any other manner.

We have shown and described our invention in a preferred form as applied to a conventional farm wagon but we are, of course, aware that changes can be made therein without departing from the spirit of our invention, the scope of which is to be determined by the appended claims.

What is claimed is:

1. In a crop dryer of the class described, the combination of a box-like drying enclosure having air penetrable side walls and solid end walls and a floor at the bottom, a hot air duct having perforated top and side walls of substantially the same length as the drying enclosure, one of the end walls of said drying enclosure having an opening adapted to communicate with the hot air duct, and the other end wall being retractable to permit outward movement of the duct with respect to the enclosure, and a roller rotatably mounted at the rear end of the floor of the drying enclosure in a position to support the duct in its outward movement.

2. In a crop dryer of the class described, the combination of a box-like drying enclosure having air penetrable side walls and solid end walls and a floor at the bottom, a hot air duct having perforated top and side walls of substantially the same length as the drying enclosure, one of the end walls of said drying enclosure having an opening adapted to communicate with the hot air duct, and the other end wall being retractable to permit outward movement of the duct with respect to the enclosure, pulling means at the rear end of the floor, and a transverse member at the inner end of the hot air duct and connected with the pulling means for moving the duct outwardly.

3. In a crop dryer of the class described, the combination of a box-like drying enclosure having air penetrable side walls and solid end walls and a floor at the bottom, a hot air duct having perforated top and side walls of substantially the same length as the drying enclosure, one of the end walls of said drying enclosure having an opening adapted to communicate with the hot air duct, and the other end wall being retractable to permit outward movement of the duct with respect to the enclosure, a roller rotatably mounted at the rear end of the floor of the drying enclosure in a position to support the duct in its outward movement, and a transverse member at the inner end of the hot air duct and operably connected to the said roller.

4. A wagon box attachment of the class described comprising the combination of an elongated duct constructed and arranged to be inserted endwise in a wagon box, a corresponding lateral projection at each side of the duct at one end thereof and by which that end of the duct is maintainable in a relation spaced from and substantially centrally between the opposite sides of the wagon box as it is inserted therein, a roller adapted to be secured to the rear end of and parallel with the floor of the wagon box, and a pulling member at each side of the duct and extending between and connecting the lateral projection at the respective side of the duct with the roller, said duct having an opening through which air is suppliable to the interior thereof and said duct having perforated sides through which air is distributively discharged from the interior of the duct.

ARTHUR A. ANDERSEN.
BERNARD C. MATHEWS.

REFERENCES CITED

The following references are of record in the file of this patent:

UNITED STATES PATENTS

| Number | Name | Date |
|---|---|---|
| 120,109 | Sampson | Oct. 17, 1871 |
| 838,248 | Fulton | Dec. 11, 1906 |
| 1,315,530 | Secord | Sept. 9, 1919 |
| 2,126,107 | Gordon | Aug. 9, 1938 |

FOREIGN PATENTS

| Number | Country | Date |
|---|---|---|
| 245,971 | Great Britain | Jan. 21, 1926 |